3,749,609
SECONDARY BATTERIES
Harold Morton, Manchester, England, assignor to Oldham International Limited, Denton, Manchester, England
Filed Jan. 12, 1972, Ser. No. 217,365
Claims priority, application Great Britain, Jan. 13, 1971, 1,676/71
Int. Cl. H01m 1/02, 7/00
U.S. Cl. 136—170                                    9 Claims

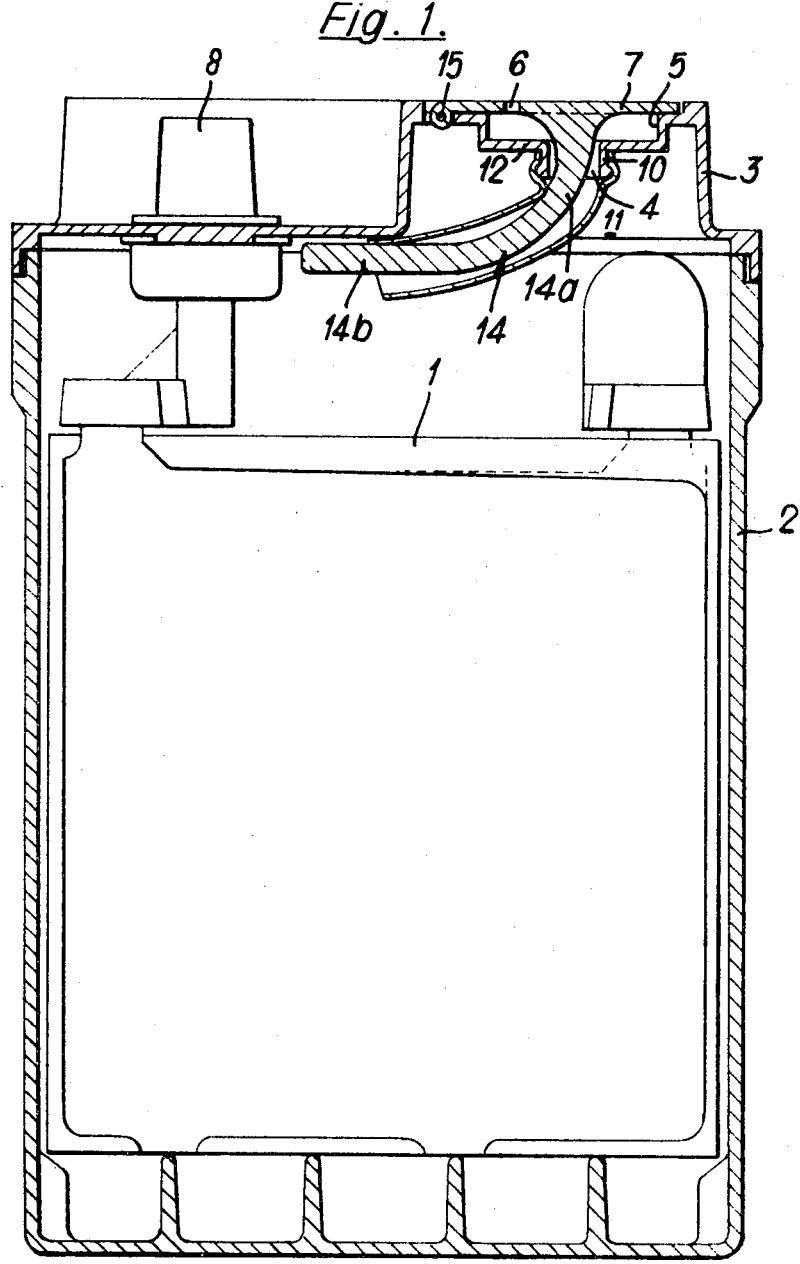

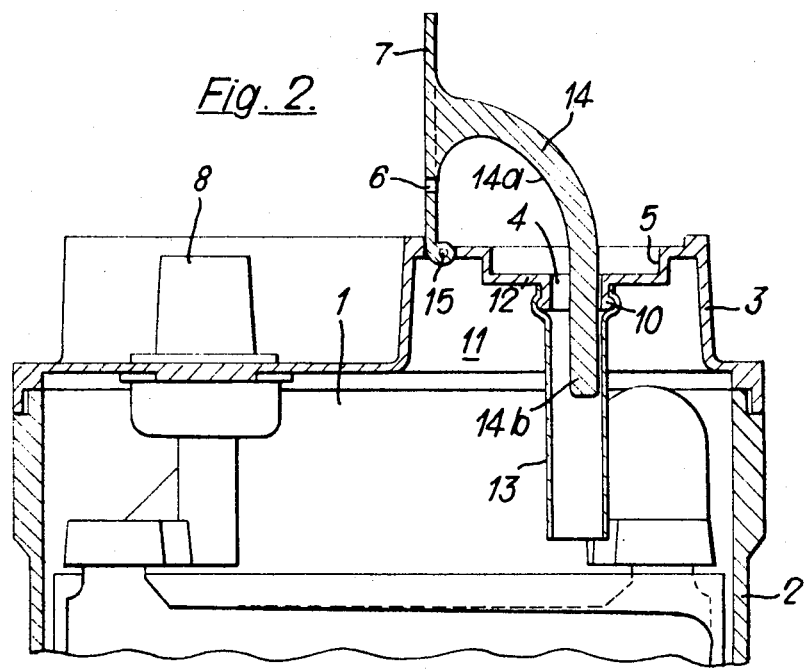
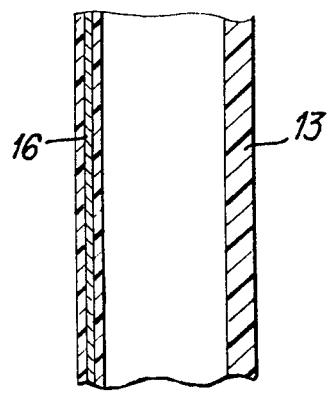

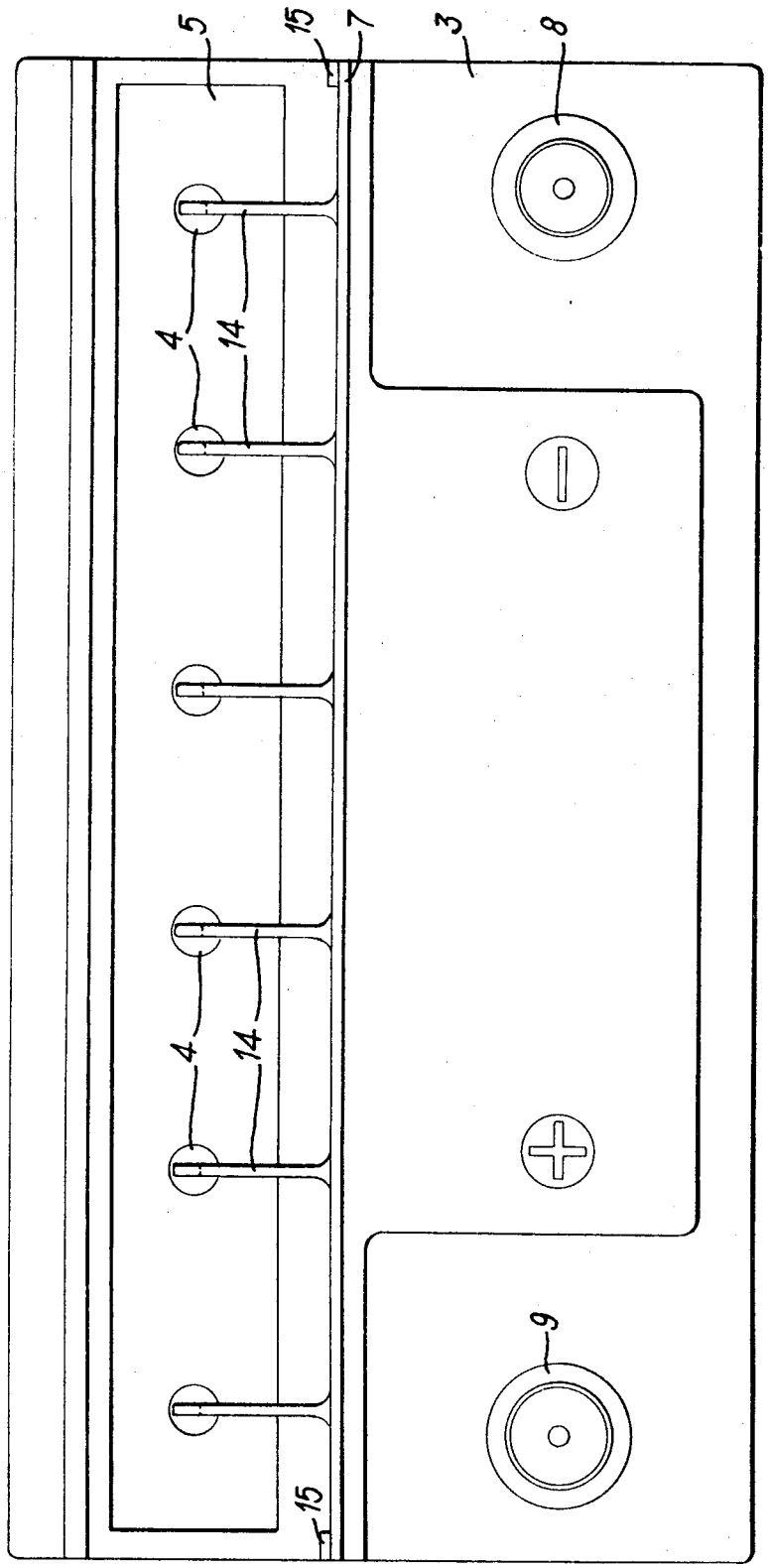

ABSTRACT OF THE DISCLOSURE

The cells of a secondary battery are each provided with a filler opening which communicates with a filling channel extending longitudinally of the lid of the battery. Resiliently deformable tubes, one for each cell, have their outer ends associated with the filler openings and their inner ends extending into the headspace of the battery. A cover for the filling channel is displaceable relatively to the channel and is provided with tube-deforming members, one for each tube, which in the channel-closing position of the cover so deform the tubes that the inner ends of the tubes are located above the level of and are directed away from electrolyte contained in the cells.

BACKGROUND OF THE INVENTION

(1) Field of the invention

The invention relates to secondary vatteries of the kind which comprise a plurality of cells in a housing closed by a lid which has a filling channel extending longitudinally of the lid and from which filler openings, one for each cell, communicate with the cells to permit the flow of water into the cells during topping-up thereof and to permit venting of the cells to atmosphere through the filling channel and a vent therefrom.

(2) Description of the prior art

It is necessary with batteries of the kind abovementioned to provide means for preventing the escape of electrolyte from the cells while permitting venting of the cells and heretofore it has been usual to use for this purpose relatively expensive and complex valve mechanisms. It is a main object of the present invention to provide a battery which avoids the provision of such valve mechanisms thus simplifying the construction of the battery and reducing the cost of production thereof.

SUMMARY

In a battery according to the invention each filler opening has the outer end of a resiliently deformable tube associated therewith and the inner ends of the tubes extend into the headspace of the battery. The cover for the filling channel is displaceable relative to the channel to provide access to the channel and to the filler openings and the cover is provided with tube-deforming members, one for each tube, which in the displaced condition of the cover permit the tubes to depend downward into the battery headspace and which in the channel-closing position of the cover so deform the tubes that the inner ends of the tubes are located above and are directed away from electrolyte to be contained in the cells.

In one embodiment of the invention the cover is pivotally mounted on the lid of the battery and the tube-deforming members are of arcuate form concentric with the pivotal axis of the cover. The tube-deforming members may each include a straight portion in extension of the arcuate portion, the straight portion being substantially parallel to the underside of the cover and so spaced from the cover as closely to underlie the lid when the cover is in its filling channel closing position.

In another embodiment of the invention the battery may include for each tube a projection which extends from a cell-forming partition or an end wall of the battery housing and which is so located closely adjacent to the tube in the open condition of the cover that the tube is engaged by a tube-deforming member and is deformed about the projection as the cover is moved to the filling channel closing position thereof.

In still another embodiment of the invention the deformable tubes are each of generally rectangular cross-section and the cover is provided for each tube with two tube-deforming members which are spaced apart to permit, when the cover is in the open condition thereof, the insertion of a hydrometer therebetween and through the filler opening and the tube associated therewith.

In yet another embodiment of the invention the cover is detachably connected to the sides of the filling channel and the deformable tubes may be, at least in the regions thereof which are connected to the filler openings, provided with corrugations transverse to the axes of the tubes.

BRIEF DESCRIPTION OF THE DRAWINGS

FIG. 1 is a section on line I—I, FIG. 3 of a battery according to the invention, a pivoted cover provided on the battery lid being shown in the closed position thereof, FIG. 2 is a view of a part of FIG. 1 showing the cover in the open position thereof, FIG. 3 is a top plan of FIG. 2, FIG. 4 is a section illustrating a modification to the battery shown in FIGS. 1 and 3, FIGS. 5 and 6 are views illustrating an alternative embodiment of the invention.

In the drawings like reference numerals refer to like or similar parts.

DESCRIPTION OF THE PREFERRED EMBODIMENTS

Figure 5:
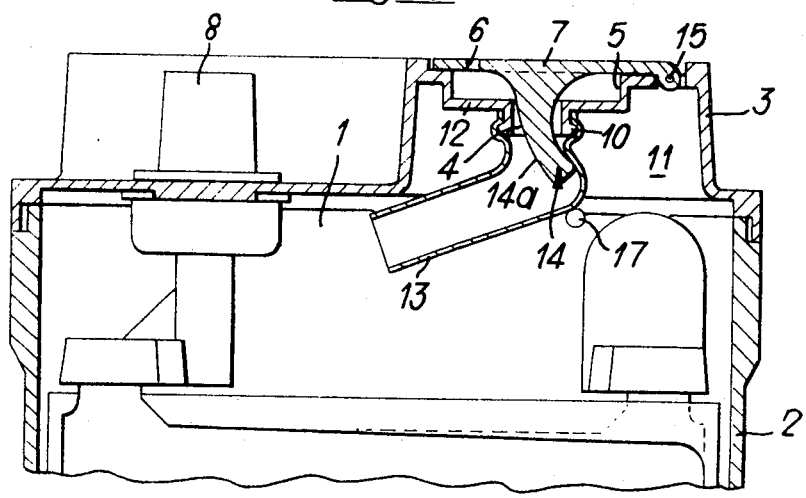

Referring to FIGS. 1 to 3, the secondary battery comprises a plurality of cells defined by partitions 1 located in a housing 2 closed by a lid 3 having a filling channel 5 which extends longitudinally of the lid 3 and is provided with filler openings 4, one for each cell, to permit the flow of water into the cells and venting of the cells to atmosphere for example through an orifice 6 in a cover 7 arranged to effect closing of the channel and to be displaceable relative to the channel to provide access to the channel and to the filler openings. As an alternative to the orifice 6 venting may be effected through a recess, not shown, in each end wall of the channel. Each cell, as is usual, is provided with positive and negative plates and separators forming no part of the invention, and the battery is provided with cell connectors, not shown, and terminal posts 8, 9.

For each cell there is provided a boss 10 which extends into the headspace 11 of the battery from the bottom 12 of the channel 5 and through which passes the filter opening 4 appropriate to the cell. A resiliently deformable cell-filling and venting tube 13 has its outer end associated with the filler opening of the cell appropriate thereto as by connection to a boss 10 and its inner end extends into the headspace 11. Tube-deforming members 14, one for each tube 13, are carried by the cover 7 and are arranged in the channel-closing position of the cover 7 so to deform the tubes 13 that the inner ends of the tubes 13 are located above the level of and are directed away from electrolyte, not shown, contained in the cells. As shown in FIGS. 1 and 2, the cover 7 is pivoted, as at 15, to the lid 3 for movement into and out of closing relationship with the channel 5. FIG. 1 illustrates the closed position of the cover 7 and FIG. 2 illustrates the open position of the cover. In the closed position of the cover, FIG. 1, a part at least of each tube-deforming member 14 extends into the tube 13 associated therewith and is engaged with a part of the interior wall of the tube. The portion 14a of each tube-deforming member 14 adjacent to the cover 7 is an arcuate portion concentric with the pivotal axis of the pivot 15 and each tube-deforming member 14 includes a straight portion 14b in extension of the arcuate portion 14a. When, as shown in FIG. 2, the cover 7 is in the open position thereof the straight portion 14b is substantially parallel with the sides of the tube 13 and is adjacent the side opposite that which is engaged by the member 14 during closing of the cover 7 and deforming of the tube 13. The straight portion 14b is substantially parallel to the underside of the cover 7 and is so spaced therefrom as closely to underlie the lid 2, see FIG. 1, when the cover is in the filler channel closing position thereof.

When the cells are to be topped up the cover 7 is opened, FIG. 2, and the deformable tubes 13 due to their resiliency assume the position shown in FIG. 2. Topping-up liquid, usually water, is then poured into the channel 5 and runs from the channel into the cells through the filler openings 4 and the deformable tubes 13. When the electrolyte in the cells reaches the inner ends of the tubes 13 the flow of liquid into the cells ceases due to the pressure of air trapped in the cells acting on the surface of the electrolyte. Thus all of the cells may be simultaneously topped up to the correct level in a single operation. The cover is then closed and the tubes 14 are deformed so that the inner ends of the tubes are moved to the cell venting position in which the inner ends of the tubes are located above the level of and are directed away from the electrolyte in the cells, FIG. 1. Gases vented through the tubes 13 and filler openings 4 pass out of the channel 5 to atmosphere through the orifice 6, or the recesses, mentioned above. Any water which may remain in the channel 5 after topping-up will drain into the cells on closing of the cover 7.

If desired the deformable tubes 13 may be reinforced by spring steel strips 16, FIG. 4, embedded in and extending lengthwise of the tubes.

Figure 6:
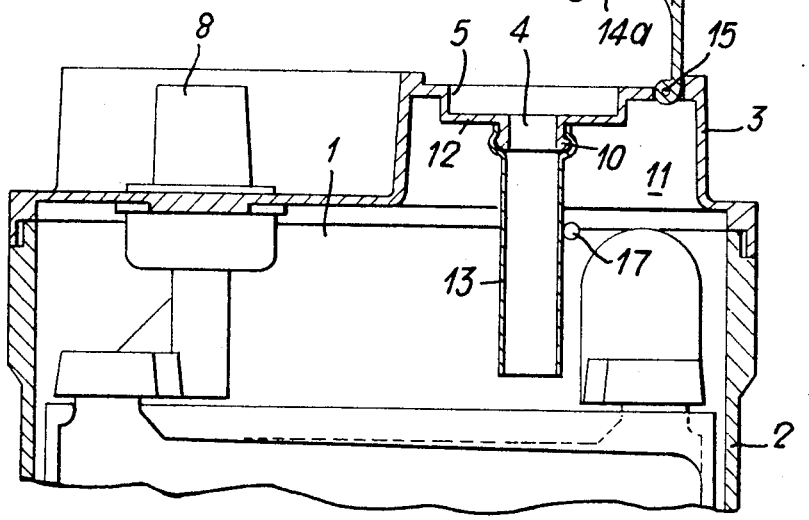

Referring to FIGS. 5 and 6, the embodiment of the invention illustrated in these figures differs from that described with reference to FIGS. 1 to 3 only in that the tube-deforming member 14 does not include a straight portion 14b and for each tube 13 there is provided a projection 17 which, as appropriate, extends from a cell-defining partition 1 or an end wall of the housing 2. The projections 17 are located closely adjacent to the tubes 13 in the open position of the cover 7, FIG. 6, in a manner such that the tubes are deformed about the projections 17 as the cover 7 is moved to the closed position thereof, FIG. 5. This embodiment of the invention has the advantage that because the tube-deforming members 14 are not engaged in the tubes 13 when the cover is in the open position, FIG. 6, a hydrometer or similar instrument can be inserted through the tubes 13 into the cells for maintenance purposes.

Figure 7:
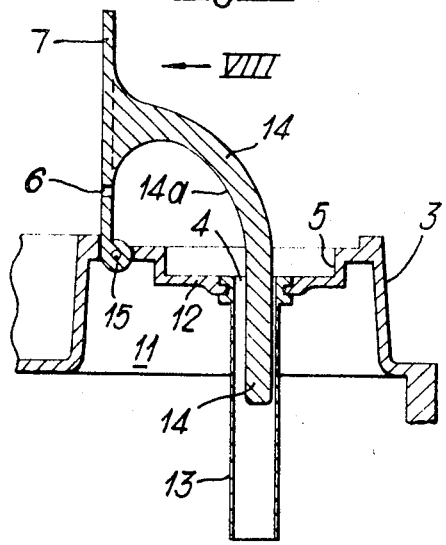
FIG. 7 is a view of a part of FIG. 2 illustrating a modification to the structure of FIG. 2.
Figure 8:
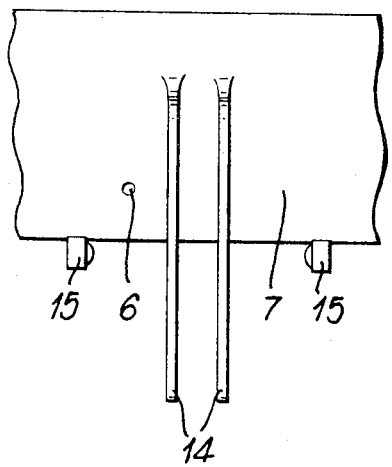
FIG. 8 is a view of the pivoted cover looking in the direction of arrow VIII, FIG. 7.

FIGS. 7 and 8 illustrate a modification of the battery illustrated in FIGS. 1 and 2. In this embodiment the cover 7 has two tube-deforming members 14 for each cell which are spaced apart as shown in FIG. 8 so that when the cover 7 is in the open condition thereof as shown in FIG. 7 a hydrometer can be inserted between the members 14 and through the filler opening 4 which, in this embodiment, accommodates the filling and venting tubes 13 which are connected directly around the filling openings in the bottom 12 of the channel 5 instead of to bosses as is the case in FIGS. 1 and 2. The tubes 13, in this embodiment, are of generally rectangular cross-section.

In each of the embodiments of the invention described with reference to FIGS. 1 to 8 the tubes 13 may be of circular, oval, or rectangular, for example square, cross-section and are made of resilient acid-resistant material such as rubber.

Figure 9:
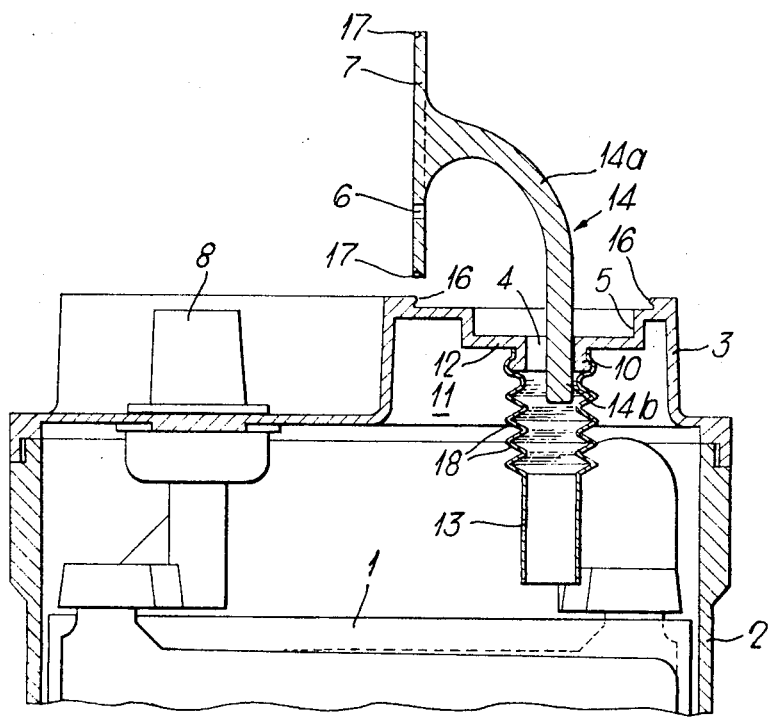
FIG. 9 is a section illustrating a modification to the battery shown in FIGS. 1 to 3.

FIG. 9 illustrates a further modification of the battery illustrated in FIGS. 1 and 2. In this embodiment the cover 7 is detachably connected to the longitudinal sides of the filling channel 5 by a plurality of snap-connections formed by slight projections 16 extending into the channel 5 from the opposite longitudinal sides of the channel and complementary recesses 17 formed in the longitudinal edges of the cover 7. It will be understood that, if desired, the projections may extend from the cover and the recesses be formed in the sides of the channel. In a six-cell battery three projections 16 may be equi-spaced along each side of the channel for co-operation with complementary recesses formed in the edges of the cover. Also in this embodiment each deformable tube 13 is, at least in the region thereof which is associated with a filler opening 4, provided with corrugations 18 transverse to the axis of the tube 13. The tube-deforming members 14 are similar to those described above with reference to FIGS. 1 and 2. When topping-up the battery the cover 7 is removed, FIG. 9 shows the cover in an intermediate position between the removed and the closing positions of the cover, so that not only can topping-up be effected but the filler openings 4 are completely exposed so that instruments, such as a hydrometer, can be inserted through the tubes 13 into the cells for maintenance purposes. The corrugated formation of the tubes 13 permits these tubes to be made from a resilient but relatively rigid plastics material.

I claim:

1. A secondary battery comprising a plurality of cells in a housing closed by a lid having a filling channel which extends longitudinally of the lid and is provided with filler openings, one for each cell, to permit the flow of water into the cells and venting of the cells to atmosphere, a cover arranged to effect closing of the channel and to be displaceable relative thereto to provide access thereto and to the filler openings, resiliently deformable cell-filling and venting tubes one for each cell, each tube having its outer end associated with the filler opening of the cell appropriate thereto and its inner end extending into the headspace of the battery, and tube-deforming members, one for each tube, carried by the cover and arranged in the channel-closing position of the cover so to deform the tubes that the inner ends of the tubes are moved to the cell-venting position in which the inner ends of the tubes are located above the level of and are directed away from electrolyte contained in the cells.

2. A battery according to claim 1, wherein the cover is pivotally mounted on the lid for movement into and out of closing relation with the filling channel.

3. A battery according to claim 2, wherein each tube-deforming member comprises a portion of arcuate form concentric with the pivotal axis of the cover.

4. A battery according to claim 3, wherein each tube-deforming member includes a straight portion in extension of said arcuate portion, said straight portion being substantially parallel to the underside of the cover and so spaced therefrom as closely to underlie the lid when the cover is in the filling channel closing position thereof.

5. A battery according to claim 4, wherein each tube is reinforced by a spring steel element embedded in and extending lengthwise of the tube.

6. A battery according to claim 3, including for each tube a projection which extends from a cell-defining partition or an end wall of the housing and is located closely adjacent to the tube in the open position of the cover in a manner such that the tube is deformed about the projection as the cover is moved to the closed position thereof.

7. A battery according to claim 2, wherein the filling and venting tubes are each of generally rectangular cross-section and the cover is provided for each filling and venting tube with two tube-deforming members spaced apart to permit, when the cover is in the open condition thereof, the insertion of a hydrometer therebetween and through the filler opening associated with the filling and venting tube.

8. A battery according to claim 1, wherein the cover is detachably connected to the longitudinal sides of the filling channel.

9. A battery according to claim 8, wherein each filling and venting tube is, at least in the region thereof which is associated with a filler opening, provided with corrugations transverse to the axis of the tube and each tube-deforming member comprises a straight portion which is insertable into a filling and venting tube and is connected to the underside of the cover by an arcuate portion, said straight portion being substantially parallel to the underside of the cover and so spaced therefrom as closely to underlie the lid in the filling channel closing position of the cover.

References Cited
UNITED STATES PATENTS

| | | | |
|---|---|---|---|
| 1,852,558 | 4/1932 | Dunzweiler | 136—178 |
| 2,391,666 | 12/1945 | Wilson | 136—178 |
| 2,506,952 | 5/1950 | Doughty | 136—178 |
| 3,508,972 | 4/1970 | Goldingay | 136—178 |

DONALD L. WALTON, Primary Examiner

U.S. Cl. X.R.

136—177, 178